(12) United States Patent
Robinson et al.

(10) Patent No.: US 9,204,013 B2
(45) Date of Patent: Dec. 1, 2015

(54) SYSTEM TO ENABLE DEVELOPMENT AND USAGE OF FIFTH COLOR SEPARATION FORMS

(71) Applicant: Xerox Corporation, Norwalk, CT (US)

(72) Inventors: David C. Robinson, Penfield, NY (US); Katherine Loj, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 51 days.

(21) Appl. No.: 14/073,934

(22) Filed: Nov. 7, 2013

(65) Prior Publication Data

US 2015/0124271 A1     May 7, 2015

(51) Int. Cl.
*H04N 1/40* (2006.01)
*H04N 1/60* (2006.01)
*H04N 1/48* (2006.01)
*H04N 1/50* (2006.01)

(52) U.S. Cl.
CPC ............... *H04N 1/6008* (2013.01); *H04N 1/48* (2013.01); *H04N 1/50* (2013.01)

(58) Field of Classification Search
CPC ............. H04N 1/46; H04N 1/54; H04N 1/60; H04N 1/6016; H04N 1/6022; H04N 1/6033; H04N 1/00002; H04N 1/00015; H04N 1/00031; H04N 1/506; H04N 9/3182
USPC ......... 358/1.9, 450, 515, 518, 504, 1.16, 524, 358/502, 296; 382/162–167
See application file for complete search history.

(56) References Cited

U.S. PATENT DOCUMENTS 4,664,501 A * 5/1987 Koizumi et al. ............... 399/179
2009/0296106 A1* 12/2009 Donaldson ..................... 358/1.9

* cited by examiner

*Primary Examiner* — Thomas D Lee
*Assistant Examiner* — Stephen M Brinich
(74) *Attorney, Agent, or Firm* — Fay Sharpe LLP (57) ABSTRACT

One embodiment of the disclosure relates to a method for creating a document print stream. The method includes receiving a first image in a first color model. The method includes generating a modified first image by extending original separation channels in the first image to include a fifth separation channel. The method includes generating a bitmap of the modified image. The method includes storing the modified image as a separation form. The method includes receiving a print job in the first color model. The method includes merging the separation form with the print job.

18 Claims, 5 Drawing Sheets

SYSTEM TO ENABLE DEVELOPMENT AND USAGE OF FIFTH COLOR SEPARATION FORMS

BACKGROUND

The present disclosure relates to a system for generating a fifth separation color to merge into print jobs rendered on a printer device capable of using a fifth colorant housing. The disclosure is also capable of determining a colorant combination considering five colorants and can be adapted to generate modified colorant separation information.

Conventional printer devices support four colorant housings: cyan, magenta, yellow, and black ("CMYK"). Conventional devices utilize these four particular colorants because, traditionally, different CMYK combinations can produce the greatest number of colors using the least amount of toner. This benefit caused the CMYK printing process, using subtractive color mixing, to become the standard in the printing industry.

Recent printer devices are configured to support a fifth colorant housing. The extra housing (cartridge) can contain a toner for a fifth color different from CMYK, such as, for example, 'red', or a magnetic ink used in Magnetic Ink Character Recognition ("MICR") printing. Certain ones of these printer devices can support any made-to-order ("custom") colorant.

Once a "made-to-order" colorant is created, it can be achieved using a combination of the five colorant housings ("CMYKX"), likely including the fifth colorant X. A method and a system are desired for creating the fifth separation color and embedding information with it. This desired method and system can build and store the fifth separation color and information as forms for later merging with a subsequent print job rendered with at least the fifth colorant.

BRIEF DESCRIPTION

One embodiment of the disclosure relates to a method for creating a document print stream. The method includes receiving a first image in a first color model. The method includes generating a modified first image by extending original separation channels in the first image to include a fifth separation channel. The method includes generating a bitmap of the modified image. The method includes storing the modified image as a separation form. The method includes receiving a print job in the first color model. The method includes merging the fifth separation channel with the print job.

Another embodiment of the disclosure relates to a system for creating a document print stream. The system includes a color separation device including an interface for receiving first and second images in original separation channels using a first color model. The system further includes a color separation module and a separation form generation module stored in a memory. The color separation module modifies the first image by extending the original separation channels to include an additional separation channel not included in the original separation channels. The color separation module creates the additional separation color using content in the first image. The system further includes a raster image processor to generate a bitmap of the modified image. The separation form generation module merges the additional separation channel with the second image to generate output. A processor in communication with the memory executes the modules.

DETAILED DESCRIPTION

Figure 1:
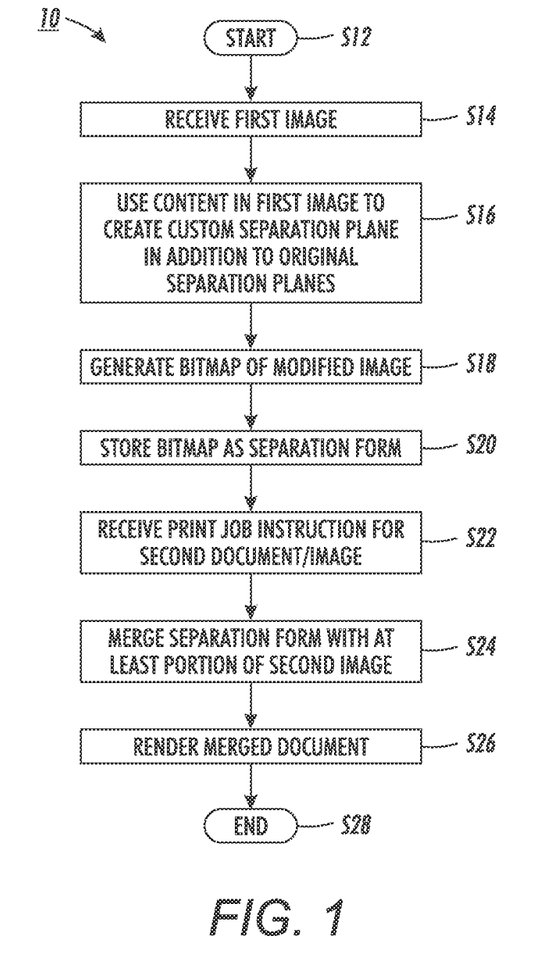
FIG. 1 is an overview of a method for creating a document print stream.

The disclosure relates to a method and a system for creating a separation form by using content in a first document or image, being defined in a first color space, such as a CMYK color space, to populate a fifth separation color that is subsequently merged into a second document for rendering output using five colorant housings. However, the process discussed herein can be used for greater than five colorant housings. Particularly, this disclosure is aimed to enable a modification of original CMYK documents for rendering in printer devices that have the ability to print using a fifth color toner. FIG. 1 is an overview of a method 10 for creating a document print stream. The method starts at S12. A first image is received at S14. The first image is received in a first color model. In the illustrated embodiment, the first image is defined in at least four color channels—i.e., the CMYK (subtractive) color model. However, the incoming image can be composed of gray, RGB, or another color model, etc. The original color channels—four (CMYK) color channels in the illustrated embodiment—are extended using the first image content to create a custom fifth color channel at S16. The creation of the fifth color channel is used to generate a modified first image at S16. A contone bitmap of the modified image is generated at S18. The bitmap of the modified image is stored as a separation form at S20. Subsequent print jobs can access the separation form to access the fifth separation color information more merging into a second document and/or image. A print instruction is received at S22 for rendering a second image. The fifth separation color is merged with at least a portion of the print job content defining the second image at S24. In this manner, the second image is modified. The second image is rendered at S26 using the original CMYK housings and a fifth housing. The method ends at S28.

Figure 2:
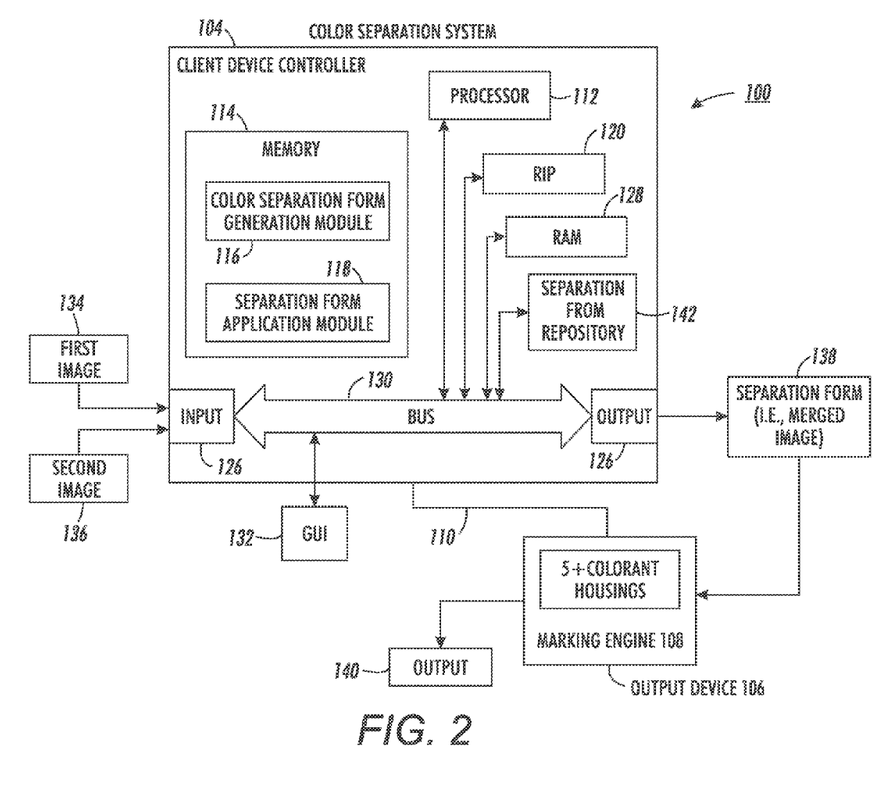
FIG. 2 is a schematic illustration of a system in one aspect of the exemplary embodiment.

FIG. 2 is a schematic illustration of a system 100 for creating a document print stream using a fifth colorant, according to one aspect of the exemplary embodiment. The system 100 may include a colorant separation device 102, hosted by a client computing device 104, such as a digital front end ("DFE") or controller, and an image forming apparatus or printer/output device 106, including a marking engine or similar rendering device 108, which are linked together by communication links 110, referred to herein as a network. These components are described in greater detail below.

The client device 104 illustrated in FIG. 2 includes a processor 112, which controls the overall operation of the colorant determination system 102 by execution of processing instructions, which are stored in memory 114 connected to the processor 112.

The operation disclosed herein is performed by the processor 112 according to the instructions stored in the memory 114. In particular, the memory 114 stores a separation form generation module 116, which uses content in a first image to create an additional color channel not included in the original multiple color channels, and a separation form application module 118, which merges the newly created color channel with at least a portion of a second image to render output using a at least a fifth housing colorant. These modules 116, 118 will be later described with reference to the exemplary method. As part of the processing, a raster image processor 120 generates a bitmap of the modified image, which is stored as the separation form.

The client device 104 includes one or more communication interfaces (I/O), such as network interfaces 126 for communicating with external devices, such as printer device 106. The various hardware components 112, 114, (random access memory "RAM") 128 of the client device 104 may all be connected by a bus 130.

With continued reference to FIG. 2, the client device 104 is communicatively linked to a user interface device (GUI) 132 via a wired and/or wireless link. In various embodiments, the user interface device 132 may include one or more of a display device, for displaying information to users, and a user input device, such as a keyboard or touch or writable screen, for inputting instructions and/or receiving status information, and/or a cursor control device, such as a mouse, trackball, or the like, for communicating user input information and command selections to the processor 112. Specifically, the user interface device 132 includes at least one of an input device and an output device, both of which include hardware, and which are communicatively linked with the client device 104 via wired and/or wireless link(s).

As mentioned, the client device 104 of the colorant separation device 102 is communicatively linked with the printer 106 via link 110. While the client device 104 may be linked to as few as one printer 106, in general, it can be linked to a fleet of printers. The exemplary printers 106 may each include the marking engine 108, which applies marking medium, such as ink or toner, to a substrate, such as paper, using, for example, a laser, inkjet, thermal, or other transfer process. The printer 106 renders images on print media, such as paper, and can be a copier, laser printer, bookmaking machine, facsimile machine, or a multifunction machine (which includes one or more functions such as scanning, printing, archiving, emailing, and faxing).

The memory 114, 128 may represent any type of tangible computer readable medium such as random access memory (RAM), read only memory (ROM), magnetic disk or tape, optical disk, flash memory, or holographic memory. In one embodiment, the memory 114, 128 may each comprise a combination of random access memory and read only memory. The digital processor 112 can be variously embodied, such as by a single-core processor, a dual-core processor (or more generally by a multiple-core processor), a digital processor and cooperating math coprocessor, a digital controller, or the like. The digital processors 112 in addition to controlling the operation of the colorant determination system 102, executes instructions stored in the modules 116, 118 for performing the parts of the method outlined below.

The software modules 116, 118, as used herein, are intended to encompass any collection or set of instructions executable by the system 100 so as to configure the system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on the server or other location to perform certain functions.

The communication interfaces 126 may include, for example, a modem, a router, a cable, and and/or Ethernet port, etc.

As will be appreciated, while colorant separation device 102 and printer 106 are illustrated by way of example, the system 100 may be hosted by fewer or more linked computing devices. Each computing device may include, for example, a server computer, desktop, laptop, or tablet computer, smartphone or any other computing device capable of implementing the method described herein.

Figure 3:
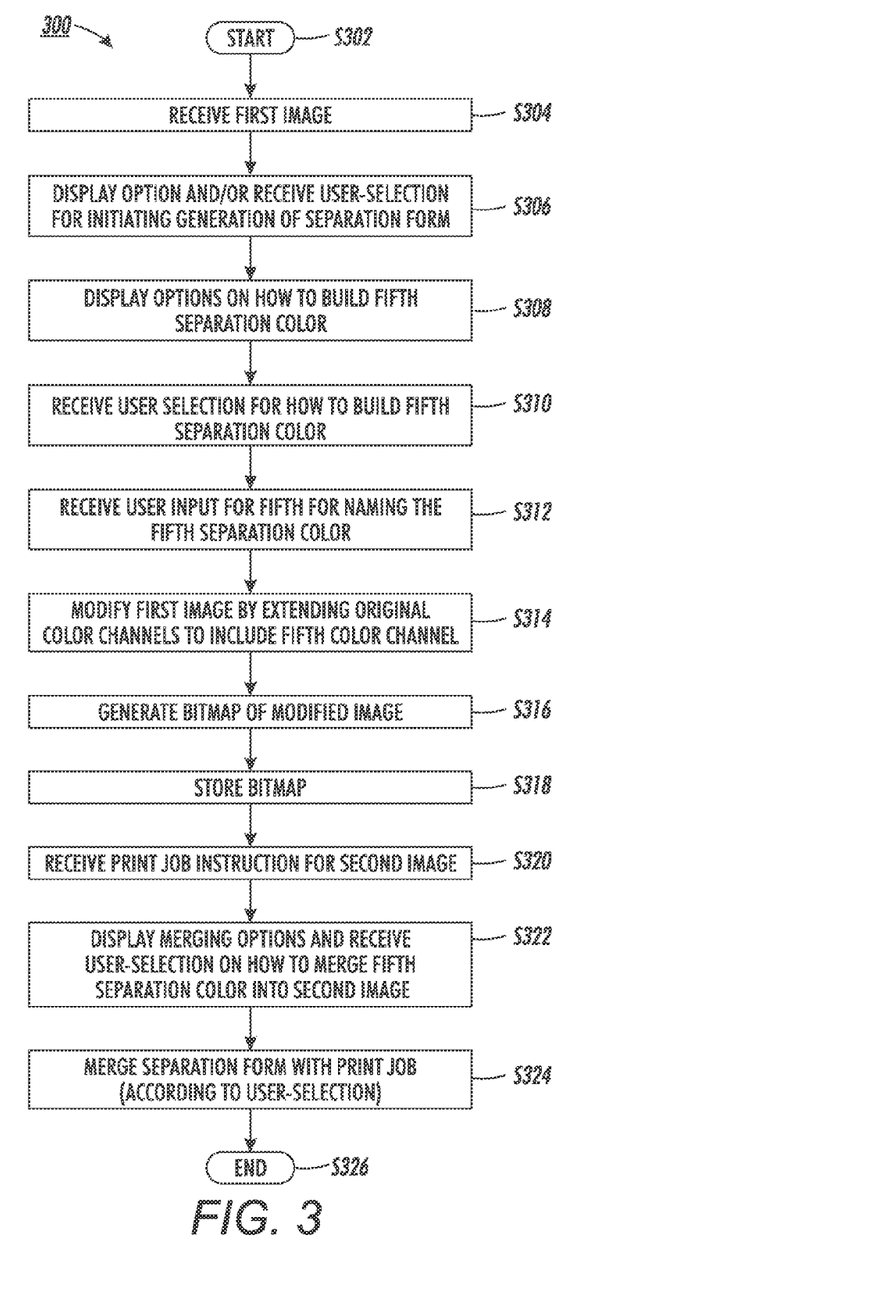
FIG. 3 is a flow chart illustrating a process for creating a document print stream using a fifth colorant according to the exemplary method.

FIG. 3 is a flow chart illustrating a method 300 for creating a document print stream using a fifth colorant according to the disclosure. The method starts at S302. The separation form generation module 116 receives a first image 134 in a first color model at S304. In the illustrated embodiment, the first image is received in a subtractive color model—being in the CMYK colorant channels. However, embodiments are contemplated where the first image can be received in an additive color model—being in the RGB color channels—or in grayscale—being in black and white colors. One aspect of the disclosure is that the graphic user interface 132 can display options for initiating a process for creating a "made-to-order" fifth separation color on a user device at S306. As part of the displayed options, or in response to a user-selection being made to initiate the generation of the separation form, the GUI can provide the user with various options on how to build the fifth separation color at S308. Example options can be displayed for one of an assignment for a spot color, a CMYK color, density, and a color separation, etc. for a print job. The GUI can receive the user-selection at S310 for instructing the system how to use the content in the first image for creating the custom color. In other embodiments, a default selection can be applied instead.

Similarly, the GUI can receive user-input for naming the fifth separation color at S312. The system can receive user-input for associating the fifth separation color with any desired name, including, for example, "red" for a shade of red, etc. In particular, the separation form generation module 116 can apply these designations to the remainder of the process, while expecting (if not already) that the corresponding fifth housing colorant is or will be loaded before rendering a later print job.

In more specific detail, the module 116 can provide the user with an option for defining the fifth separation color. For example, the system can receive a user-selection for a desired red color having L*a*b values x,y,z. The selection can be written into a header for the fifth separation color. The value is later used when rendering a print job for determining whether the fifth colorant is to be loaded. In response to the fifth colorant not being loaded, the system can use the desired L*a*b values to render the desired color with the five (CMYK+X) available colorant housings that are loaded in the marking engine.

In the illustrated embodiment, the GUI can use the fifth colorant currently loaded in the marking engine 108. In a contemplated embodiment, the system 100 can perform the process for potential fifth-colorant housings, and receive or automatically make a selection at a later time.

At S314, the module 116 generates a modified image by by extending the original (e.g., CMYK) color channels in the first image to include a fifth colorant channel designated at S314. In more detail, the fifth separation color is created using image content in the first image according to the user-selection made at S310.

Figure 4:
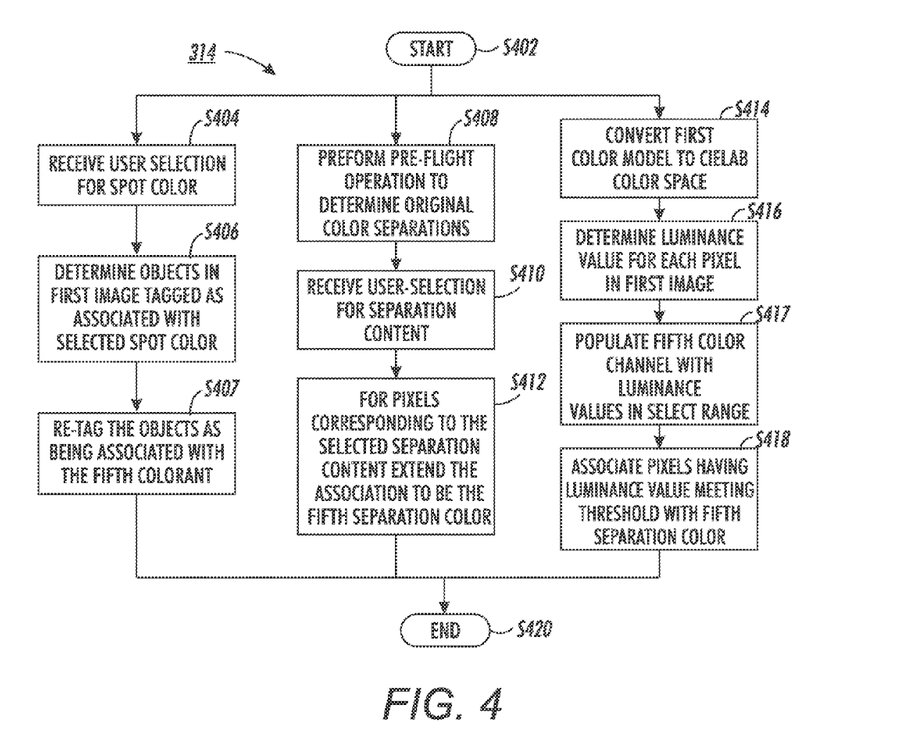
FIG. 4 is a flowchart illustrating a method for modifying an image.

FIG. 4 is a flowchart illustrating the various embodiments for building the fifth separation color. The method starts at S402. In one embodiment, in response to the module 116 receiving a user-selection at S310 to build the fifth separation color based on a spot color, the GUI receives a user-selection for which spot color at S404. The module determines which objects in the first image are tagged as being assigned to the selected spot color at S406. In other words, the raster image processor detects the pixels that are the specified spot color. The module re-tags the objects as being associated with the fifth separation colorant at S407. Only these tagged objects are raster image processed as a fifth colorant separation.

In another embodiment, in response to the module 116 receiving a user-selection at S310 to build the fifth separation color and extend original color separations, the module performs a pre-flight operation at S408 to determine the original color separations that are present in the image. Page Description Language ("PDL") files, for example, can provide the printer devices with color separation information. Color separation is the act of decomposing a digital image into single color layers (s.a., in four basic CMYK toner colors) for rendering the image in an offset printing process. Each single color layer is printed separately, one on top of the other, to give the impression of a desired color.

In other words, the module 116 RIPs the first image to build CMYK separation values at S408. The pre-flight operation can include RIPping the first image to a CMYK color model composed of four separation planes. The module receives a user-selection designating separation content at S410. For pixels associated with the selected separation, the module extends the association to include the fifth separation color at S412. In other words, the resultant separations of the selected content are zeroed out or swapped with the fifth separation color. One of the original CMYK separations are used to later force the fifth separation color into the second image. The separation form is generated to include the user-defined separation data as its content.

In another embodiment, in response to the module 116 receiving a user-selection at S310 to transform the image content according to density, the module converts the first color model (e.g., CMYK, RGB, gray etc.) of the first image to a CIELAB color space at S414. A luminance value is determined for each pixel in the first image at S416. A selected range within these luminance values are used to populate the fifth color channel at S417. A Toner Reproduction Curve ("TRC") may be used to aid a conversion from the luminance to the separation color. At S418, the module 116 associates the designated fifth separation colorant with each pixel having original luminance values being equal to or within the selected range.

In another embodiment (not shown) where the first image is received as a grayscale image, the module can map the grayscale value to a K separation. The module associates the designated fifth colorant housing with each pixel of the K separation. In other words, the module extends the K separation to include the fifth separation color, and the original K separation is then filled with zeros (explain). The method ends at S420.

By associating the fifth colorant channel with content and/or pixels in the first image, the module 116 is essentially extending the original separation colors to include a new separation color. All the other pixels and/or content not associated with the new separation color remain as they were originally defined. Furthermore, more than one spot color, separation color, luminance value, and color combinations, etc. can be selected and parallel processes can be performed.

Returning to FIG. 3, the module 116 generates a bitmap of the modified first image at S316. A bitmap is a type of graphics file in which a separate value for each pixel of the image is stored in a bit or group of bits. In other words, pixels of the modified image are digitized to create a "contone" image giving the illusion of continuous tone. A contone image can include "24-bit" (RGB) or "32-bit" (CMYK)—i.e., be 32 bits deep—depending on the color model. A CMYK image, for example, has four channels, each of which is 8 bits deep. In the illustrated example, the bitmap of the modified image can be 40-bits deep because of the five separation colors CMYKX. In contemplated embodiments, the bitmap or contone image can be generated by raster image processing only the objects tagged as being associated with the newly created fifth separation color.

The bitmap of the contone image is stored by the module 116 as a separation form at S318. In one embodiment, the separation form is stored in a separation form repository 142, s.a., e.g., a default location for separation forms that is separate from a storage for other background forms. This file location can be automatically made available to the user in response to the receipt of a second image. In other words, access to this storage location can be made available, either automatically or via user-selection/instruction, in response to the separation form application module 118 receiving the second document and/or image as part of a print job instruction.

In an alternate embodiment, the file location can be provided to the user in response to user-instruction to merge a a previously generated separation form with a subsequent print job.

In one embodiment, after the separation form is created, the GUI can provide the user with options for editing the separation form. The system is operable to receive a user-selection for particular edits, such as, for example, the addition of text and/or editing of the image content (via, e.g., clipping/cropping/scaling/rotating, etc) before storing the form in storage.

Continuing with FIG. 3, the separation form generation module 118 receives a second image and/or document as part of a print job instruction at S320. In response to the user selecting the separation form from the repository 142, the GUI 132 can provide the user with options for how the separation form is to be merged with the print job at S322. The options may include, for example, applying the separation form to select portions of the print job. In response to receiving the user-selection on how to merge the fifth separation color into the second image, the module 118 merges the fifth separation color with the print job at S324.

Figure 5:
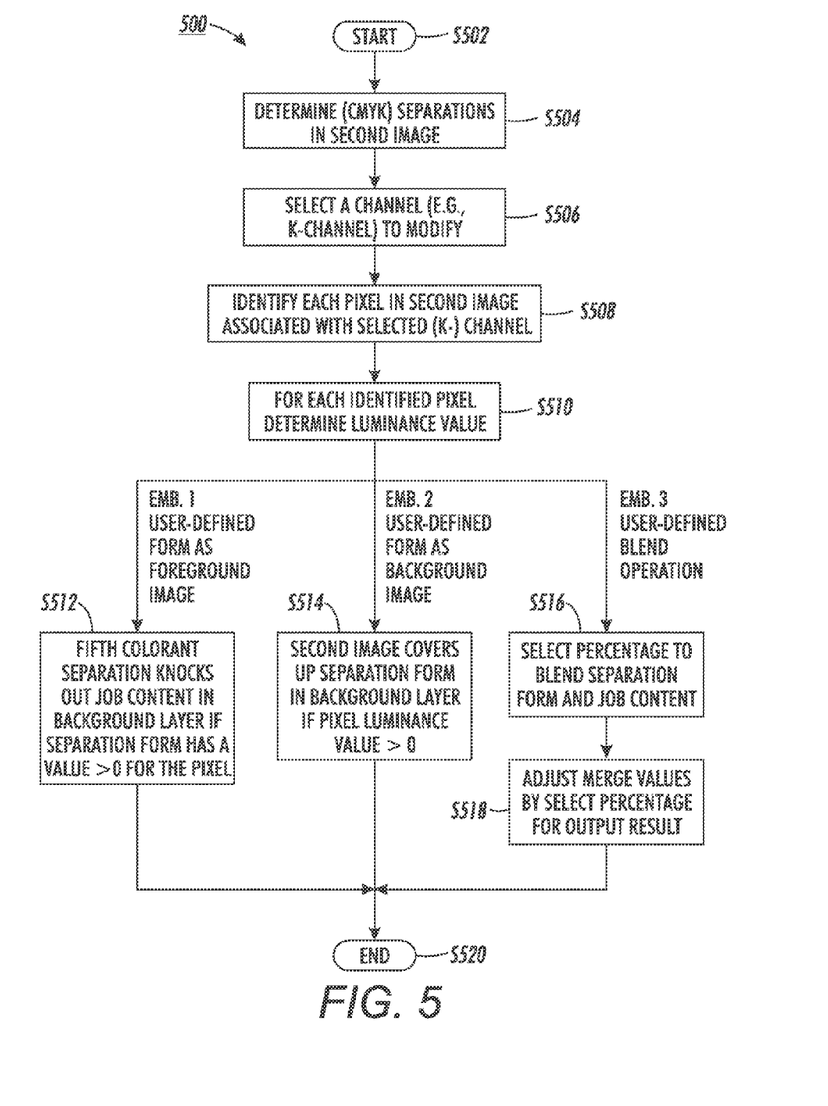
FIG. 5 is a flowchart illustrating a method for merging the fifth separation color into a second image.

FIG. 5 is a flowchart that shows a method 500 for merging the fifth separation color with the second image based on the user-section made at S324. Options can be displayed for prompting the selection. One option may be for treating the separation form as a foreground image ("top layer") and the second image as the background ("bottom layer"). A second option may be for treating the separation form as a background land the second image as the foreground. A third option may enable a user to define a merge percentage, which is discussed later. The method starts at S502.

The system determines the original (e.g., CMYK) separations in the second image at S504. The system selects at least one of the channels to modify at S506. For illustrative purposes, the K-channel can be selected. This selection can be made by a user simultaneously with the selection made at S324. This selection can be predetermined in another embodiment, such as by user-input received before the process starts at S400. In yet another contemplated embodiment, the selection can be made by the system by default. At S508, the system identifies each pixel in the second image that is associated with the selected (K-) channel. The system determines a luminance value for each of the identified pixels at S510. For illustrative purposes, an example one of the identified pixels may have a luminance value of 50. The value is within a range of 0 to 255 in a CIEL*a*b space. The fifth colorant created in FIG. 4 also has a luminance value. For illustrative purposes, the example luminance value of the created fifth colorant can be 150.

If at S324, the option was selected for treating the separation form as the foreground image, the fifth colorant separation knocks out the job content in the background layer if the separation form has a luminance value greater than zero "0" at S512. If at S324, the option was selected for treating the separation form as the background image, the job content in the second image covers up the form separation in the background layer for the identified pixels having a luminance value greater than zero "0" at S514. Embodiments are contemplated, however, where a threshold luminance value can be selected and/or predetermined by a user or the system. For example, the threshold luminance value can be 50. Therefore, at S512, the fifth colorant separation can knock out the job content in the background layer if the separation form has a luminance value greater than 50. Because the example luminance value is 150, the separation form would knock out the job content. Similarly, at S514, because the example luminance value is 50, the second image would cover up the separation form in the background layer in the contemplated embodiment.

However, if at S324, the option is to merge the second image and the separation form, the system selects a percentage to blend the separation form and job content at S516. For illustrative purposes, this percentage may be 50%. The user may define the percentage, which can be received by the system as input at the time of the merge selection. This selection can be predetermined in another embodiment, such as by user-input received before the process starts at S400. In yet another contemplated embodiment, the selection can be made by the system by default.

The blending scheme includes adding some of the content from the background image/layer to the foreground image/layer by the select percentage at S. Therefore, if the background image pixel value is 0 and the foreground image (i.e., separation form) value is 150, then the background image pixel value is adjusted to add 50 of the foreground image pixel value, and likewise the foreground image pixel value is decreased by 50%. The new pixel value for the foreground image is 75 and the new pixel value for the background is 75. These adjusted merge values end up in the output result at S518. The method ends at S520.

After the merging operation at S324, the print job can be rendered using the original separation colorants for the unselected portions and the fifth separation color or a color combination using the fifth housing colorant for the selected image portions. The method ends at S326.

Although the method was illustrated and described above in the form of a series of acts or events, it will be appreciated that the various methods or processes of the present disclosure are not limited by the illustrated ordering of such acts or events. In this regard, except as specifically provided hereinafter, some acts or events may occur in different order and/or concurrently with other acts or events apart from those illustrated and described herein in accordance with the disclosure. It is further noted that not all illustrated steps may be required to implement a process or method in accordance with the present disclosure, and one or more such acts may be combined. The illustrated methods and other methods of the disclosure may be implemented in hardware, software, or combinations thereof, in order to provide the control functionality described herein, and may be employed in any system including but not limited to the above illustrated system 100, wherein the disclosure is not limited to the specific applications and embodiments illustrated and described herein.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for creating a document print stream, the method comprising:
   receiving a first image in a first color model;
   generating a modified image by extending the original separation channels to include a fifth color channel;
   generating a bitmap of the modified image;
   storing the modified image as a separation form;
   receiving a print job for a second image in the first color model; and, merging the separation form with the print job.

2. The method of claim 1, wherein the generating the modified image includes using content in the first image to create a custom separation channel.

3. The method of claim 2, wherein the generating the modified image further includes:
   determining objects in the first image tagged as being associated with a selected spot color; and,
   re-tagging the objects as being associated with the fifth color channel.

4. The method of claim 2, wherein the generating the modified image further includes:
   associating the fifth color channel for pixels in the first image corresponding with select separation content.

5. The method of claim 2, wherein the generating the modified image further includes:
   determining a luminance value for each pixel in the first image;
   populating the fifth color channel with luminance values in a select range; and,
   associating pixels having the luminance value meeting a threshold with the fifth color channel.

6. The method of claim 1, wherein the merging includes:
   identifying pixels in the second image associated with a select original separation channel;
   knocking out job content of the second image at the identified pixels using the fifth separation channel; and,
   rendering the second image as a background image and rendering the separation form as a foreground image.

7. The method of claim 1, wherein the merging includes:
   identifying pixels in the second image associated with a select original separation channel;
   covering up the fifth separation channel using job content of the second image at the identified pixels; and,
   rendering the second image as a foreground image and rendering the separation form as a background image.

8. The method of claim 1, wherein the merging includes:
   determining a percentage to blend the separation form with the second image; and,
   adjusting luminance values of the separation form and pixels in the second image by the select percentage.

9. A computer program product comprising tangible media which encodes instructions for performing the method of claim 1.

10. A non-transitory computer readable medium comprising instructions for causing a processor in a computer to create a document print stream, the processor being adapted to:
receive a first image in a first color model;
generate a modified image by extending the original separation channels to include a fifth color channel;
generate a bitmap of the modified image;
store the modified image as a separation form;
receive a print job for a second image in the first color model; and,
merge the separation form with the print job.

11. A system for creating a document print stream, the system comprising:
a processor; and
a non-transitory computer readable memory storing instructions that are executable by the processor to:
receive first and second images in multiple separation channels using a first color model;
modify the first image to extend the original separation channels in the first image to include separation fifth color channel not included in the multiple separation channels;
generate a bitmap of the modified image; and
merge the additional separation
with a print job to generate output.

12. The system of claim 11, wherein the processor is further operative to use content in the first image to create a custom separation channel.

13. The system of claim 12, wherein the processor is further operative to:
determine objects in the first image tagged as being associated with a selected spot color; and,
re-tag the objects as being associated with the fifth color channel.

14. The system of claim 12, wherein the processor is further operative to:
associate the fifth color channel for pixels in the first image corresponding with select separation content.

15. The system of claim 12, wherein the processor is further operative to:
determine a luminance value for each pixel in the first image;
populate the fifth color channel with luminance values in a select range; and,
associate pixels having the luminance value meeting a threshold with the fifth color channel.

16. The system of claim 11, wherein the processor is operative to:
identify pixels in the second image associated with a select original separation channel;
knock out job content of the second image at the identified pixels using the fifth separation channel; and,
render the second image as a background image and rendering the separation form as a foreground image.

17. The system of claim 11, wherein the processor is operative to:
identify pixels in the second image associated with a select original separation channel;
cover up the fifth separation channel using job content of the second image at the identified pixels; and,
render the second image as a foreground image and rendering the separation form as a background image.

18. The system of claim 11, wherein the processor is operative to:
determine a percentage to blend the separation form with the second image; and,
adjust luminance values of the separation form and pixels in the second image by the select percentage.

* * * * *